No. 873,177. PATENTED DEC. 10, 1907.
W. F. SCHNEIDER.
SYSTEM OF MOTOR CONTROL.
APPLICATION FILED MAR. 25, 1907.
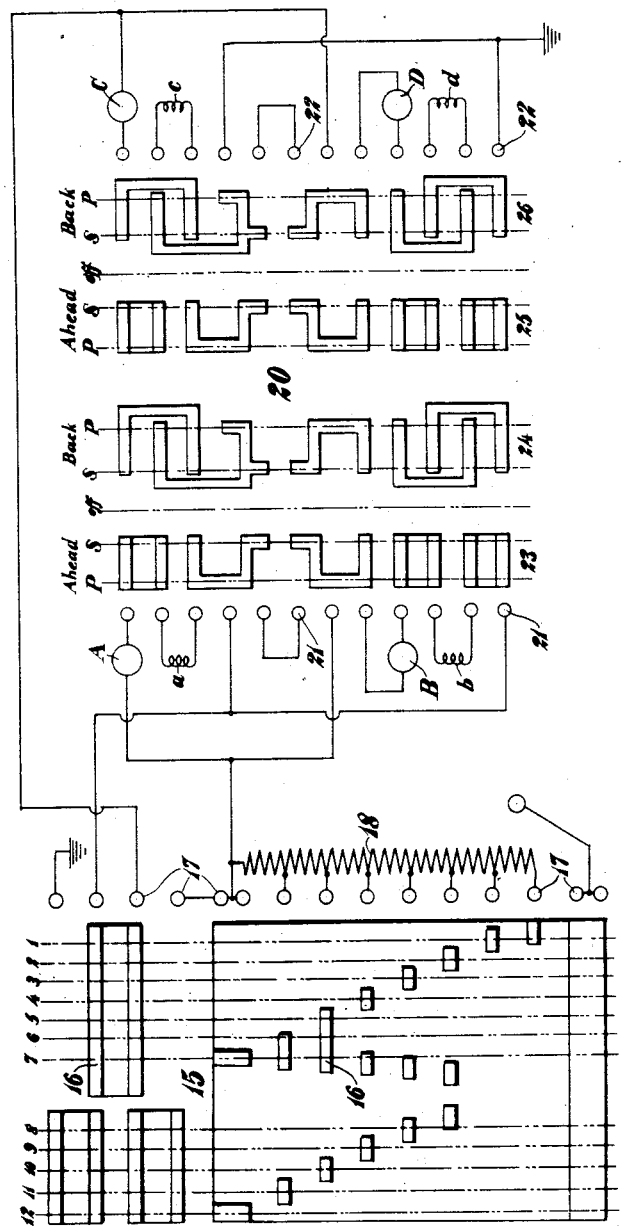

UNITED STATES PATENT OFFICE.

WILLIAM F. SCHNEIDER, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF MOTOR CONTROL.

No. 873,177.     Specification of Letters Patent.     Patented Dec. 10, 1907.

Application filed March 25, 1907. Serial No. 364,293.

*To all whom it may concern:*

Be it known that I, WILLIAM F. SCHNEIDER, a citizen of the United States, residing at Norwood, in the county of Hamilton and State of Ohio, have invented certain new and useful Improvements in Systems of Motor Control, of which the following is a full, clear, and exact specification.

My invention relates to controllers for electric motors.

It is sometimes desirable in motor controllers that an auxiliary switch be provided for so changing the relationship of the different motors or groups of motors that the same operation of the main controlling switch produces different results. This is especially useful for instance in railway controllers for cars which are operated both within city limits where high speeds are prohibited and beyond city limits where high speeds are allowable.

My present invention aims to provide such a controller and to combine with the reversing switch the switch for varying the relationship of the motors or groups of motors.

With these objects in view my invention broadly comprises the combination in a controller for electric motors, of a main controlling switch, and a combined reversing and series-parallel switch, the former being independent of the latter when the latter is in either series or parallel position.

More specifically my invention comprises the combination in a motor control system, of a plurality of groups of motors, a main switch for varying the resistance in circuit with the motors and for changing the groups of motors from series to parallel and vice versa, and a separately operated switch for changing the individual motors in the groups from series to parallel and vice versa and for reversing the motors.

Other features of my invention will appear from the following description and drawings and will be particularly pointed out in the claims.

The single figure of the drawing shows a diagram of connections of a system of control embodying my invention, the contact carrying drums being shown in development.

The electric motors A, B, C and D, having field windings *a*, *b*, *c* and *d*, are arranged in pairs or groups, A and B forming one group while C and D form another. A main series-parallel controlling switch, consisting of a rotatable drum 15 provided with contacts 16 which coöperate with stationary contacts 17, has operative positions 1 to 12 inclusive. In the first seven of these positions the upper part of the main controlling switch connects the groups of motors in series while the lower part connects different amounts of the resistance 18 in circuit with the motors. In the last five of these positions the upper part of the main controlling switch connects the groups of motors in parallel while the lower part again connects different amounts of the resistance 18 in circuit. This type of series-parallel controlling switch is shown merely for the purpose of illustration, for my invention is not limited to any particular type of controller. In fact in some cases it is not necessary to use a series-parallel main switch at all, the drum 15 being arranged merely for rheostatic control.

The drum 20 of the reversing switch coöperates with two rows of stationary contacts 21 and 22, these rows being arranged diametrically opposite. On the drum 20 are four rows of contacts, rows 23 and 24 coöperating with the row of stationary contacts 21, while rows 25 and 26 coöperate with the other row of stationary contacts 22. As indicated the rows of contacts 23 and 25 are in engagement with the rows of stationary contacts 21 and 22 respectively when forward movement of the motors is desired, while the rows of contacts 24 and 26 are in engagement with said rows of stationary contacts respectively when backward movement of the motors is desired. Each of the rows of movable contacts has two operative positions, P and S. When the reversing switch is in a position S the individual motors of the groups are connected in series, while when it is in a position P they are connected in parallel. When the reversing switch is in its "Off" position, the motor circuits are broken and can not be completed by the main drum 15. Any desired interlocking mechanism may be used between the drums 15 and 20.

By moving the main drum 15 when the reversing switch is in position "Ahead S", the resistance 18 may be varied and the motors connected in series or in parallel series for forward movement. Save that the direction of currents in the field magnets *a*, *b*, *c* and *d* is reversed, the connections with the reversing switch in position "Back S" are the same as for position "Ahead S". These two positions are desirable for comparatively low speeds, such as usually will be necessary for a car within the limits of a city.

By moving the main drum 15 when the reversing switch is in position "Ahead P", the resistance 18 may be varied and the motors connected in series parallel or in parallel. Save that the direction of current in the field windings a, b, c and d is reversed, the connections with the reversing switch in position "Back P" are the same as for position "Ahead P". These two positions are desirable for comparatively high speeds, such as are usually allowable for interurban service. Thus the drum 15 controls the connections of the groups of motors in series or parallel and the amount of the resistance 18 in circuit, while the drum 20 controls the direction of movement of the motors and the series or parallel arrangement of the individual motors of the groups.

There may be any desired number of groups of motors and any number of motors in each group. In some instances it might be desirable to have only one group of motors and the main controlling switch merely a rheostat, in which case the latter could be similar to the lower part of the drum 15 which is illustrated and the motors C and D and the rows of contacts 22, 25 and 26 on the reversing switch would be omitted, the lead from the lowest contact 21 being grounded.

Many modifications may be made in the precise arrangements herein shown and described, and all such which come within the spirit and scope of my invention I aim to cover in the following claims.

What I claim as new is:—

1. In a controller for electric motors, a resistance-varying switch, and a combined reversing and series-parallel switch, the former being independent of the latter when the latter is in either series or parallel position.

2. In a controller for electric motors, a main regulating switch, and a combined series-parallel and reversing switch, the former being completely operable for any operative position of the latter.

3. In a controller for electric motors, a plurality of series-parallel switches, one of said switches being combined with a reversing switch, and another being operable when the first is in either series or parallel position.

4. In a controller for electric motors, a plurality of series-parallel switches, one of said switches being combined with a reversing switch and another with a resistance-varying switch, the latter being operable for all operative positions of the former.

5. In a controller for electric motors, a switch for varying the relationship of the motors to be controlled in one manner, and a second switch for varying the relationship of the motors to be controlled in another manner and for reversing the motors.

6. In a controller for electric motors, a switch for varying the relationship of the motors to be controlled in one manner and for varying the resistance in the motor circuits, and a second switch for varying the relationship of the motors in another manner and for reversing the motors.

7. In a controller for electric motors, a combined series-parallel and resistance-varying switch, and a separate combined series-parallel and reversing switch, the former being movable to both series and parallel positions when the latter is in either series or parallel position.

8. In a controller for electric motors, the combination of a rotatable series-parallel and resistance-varying drum, and a rotatable series-parallel and reversing drum, the former being movable in both series and parallel positions for all operative positions of the latter.

9. In a controller for electric motors, a rotatable resistance-varying drum, and a separate rotatable series-parallel and reversing drum, the former being completely operable whether the latter is in series or parallel position.

10. In a controller for electric motors, a plurality of rotatable series-parallel drums, one of said drums being combined with a reversing switch, and another being operable whether the first is in a series or a parallel position.

11. In a system of motor control, a plurality of motors to be controlled, a switch for varying the resistance in the motor circuits, and a separate switch for reversing the motors and for connecting them in series or in parallel, the former switch being completely operable regardless of what operative position the latter occupies.

12. A system of motor control, comprising a plurality of groups of motors, a switch for connecting the groups of motors in different relations, and a separate switch for connecting the individual motors in each group in different relations and for reversing the motors.

13. A system of motor control, comprising a plurality of groups of motors, a switch for varying the resistance in circuit with said motors and for connecting the different groups of motors in various relations, and a separate switch for reversing the motors and for connecting the individual motors in each group in different relations.

14. A motor control system, comprising a plurality of groups of motors, a rotatable drum for connecting said groups of motors in series or in parallel, and a second rotatable drum for reversing the motors and for connecting the individual motors of each group in series or parallel.

15. A system of motor control, comprising a plurality of groups of motors, a rotatable drum for varying the resistance of the motor circuits and for connecting the groups of motors in series or in parallel, and a separate rotatable drum for reversing the motors and for connecting the motors of the individual groups in series or in parallel.

16. A motor control system, comprising a plurality of motors, a main switch for controlling the speeds of said motors, and a separately operated switch for reversing said motors and for connecting them in different relations, the former switch being independent of the latter when the latter is in any operative position.

17. In a motor control system, a plurality of motors, a main controlling switch, a reversing switch having two sets of positions, and connections so arranged that with the reversing switch in any one of one set of positions the controlling switch may connect the motors in either series or parallel series, and with the reversing switch in any one of another set of positions the controlling switch may connect the motors in either series parallel or parallel.

18. In a motor control system, a plurality of motors, a main controlling switch, a reversing switch having two sets of positions, and connections so arranged that with the reversing switch in any one of one set of positions the controlling switch may connect the motors in either series or parallel series, and with the reversing switch in any one of the other set of positions the controlling switch may connect the motors in either series parallel or parallel, said controlling switch being also arranged to vary the resistance in circuit with the motors.

19. In combination, a plurality of motors, a resistance, a combined series-parallel and reversing switch for said motors, and means for connecting said resistance in series with all of said motors whether the latter are connected in series or parallel.

20. In combination, a plurality of motors, a resistance, a combined series-parallel and reversing switch for said motors, and means for connecting said resistance in series with all of said motors whether the latter are connected in series or parallel and for varying the amount of said resistance in circuit.

In testimony whereof I affix my signature, in the presence of two witnesses.

WILLIAM F. SCHNEIDER.

Witnesses:
   GEO. B. SCHLEY,
   FRED J. KINSEY.